Figure 1:
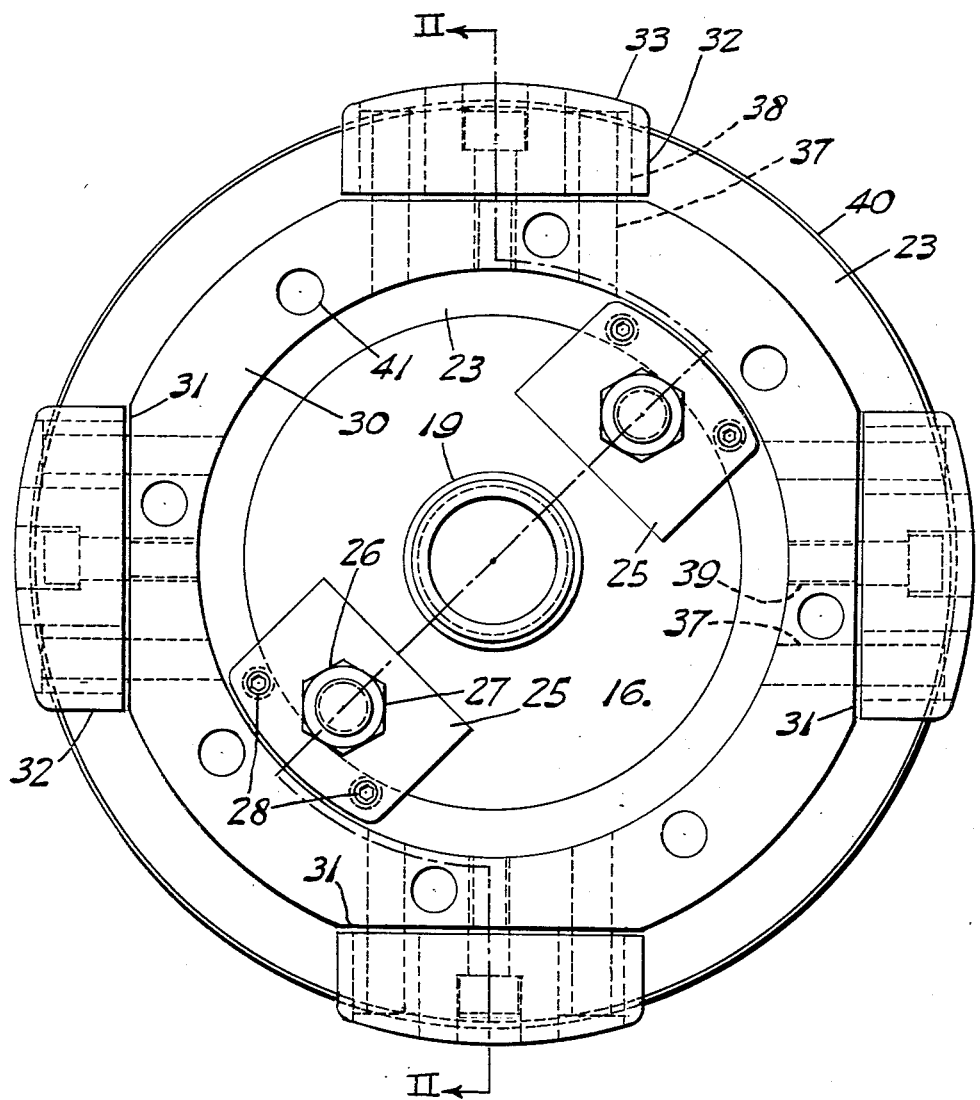

May 23, 1961 W. C. BURT 2,984,954
ABRASIVE CYLINDER WRAP TENSION ADJUSTMENT
Filed Aug. 8, 1958 2 Sheets-Sheet 1

INVENTOR.
WILLIAM C. BURT
BY
Bean, Brooks, Buckley&Bean
ATTORNEYS

May 23, 1961

W. C. BURT 2,984,954

ABRASIVE CYLINDER WRAP TENSION ADJUSTMENT

Filed Aug. 8, 1958

2 Sheets-Sheet 2

INVENTOR.
WILLIAM C. BURT
BY
Bean Brooks Buckley & Bean
ATTORNEYS

United States Patent Office 2,984,954
Patented May 23, 1961

2,984,954
ABRASIVE CYLINDER WRAP TENSION ADJUSTMENT

William C. Burt, Olean, N.Y., assignor to Clair Manufacturing Co., Inc., Olean, N.Y.

Filed Aug. 8, 1958, Ser. No. 754,084
4 Claims. (Cl. 51—194)

This invention relates to rolls for abrading, polishing and finishing machines and more particularly to roll constructions of the type wherein a sheet of abrading, polishing or finishing paper or cloth is wrapped helically about a roll, such rolls being known in the art as spiral-wrap or spiral-wound rolls.

Rolls of the general type contemplated in the present invention are usually of substantially greater axial length than diameter and means are conventionally provided at the ends of the rolls for attaching or holding the ends of the spiral-wrap sheet of surfacing material and for adjusting the same so that it is wrapped or wound tautly about the roll. The present invention provides a novel clamping and adjusting structure for this general purpose which accomplishes the desired functions in a new and more effective manner and in which the clamping and adjusting operations may be performed simply and speedily.

A single complete embodiment of the principles of the present invention is illustrated in the accompanying drawings and described in detail in the following specification. However, it is to be understood that such embodiment is by way of example only and that various mechanical modifications may be made therein without departing from the principles and teachings of the present invention, the scope of which is not limited excepting as defined in the appended claims.

Figure 2:
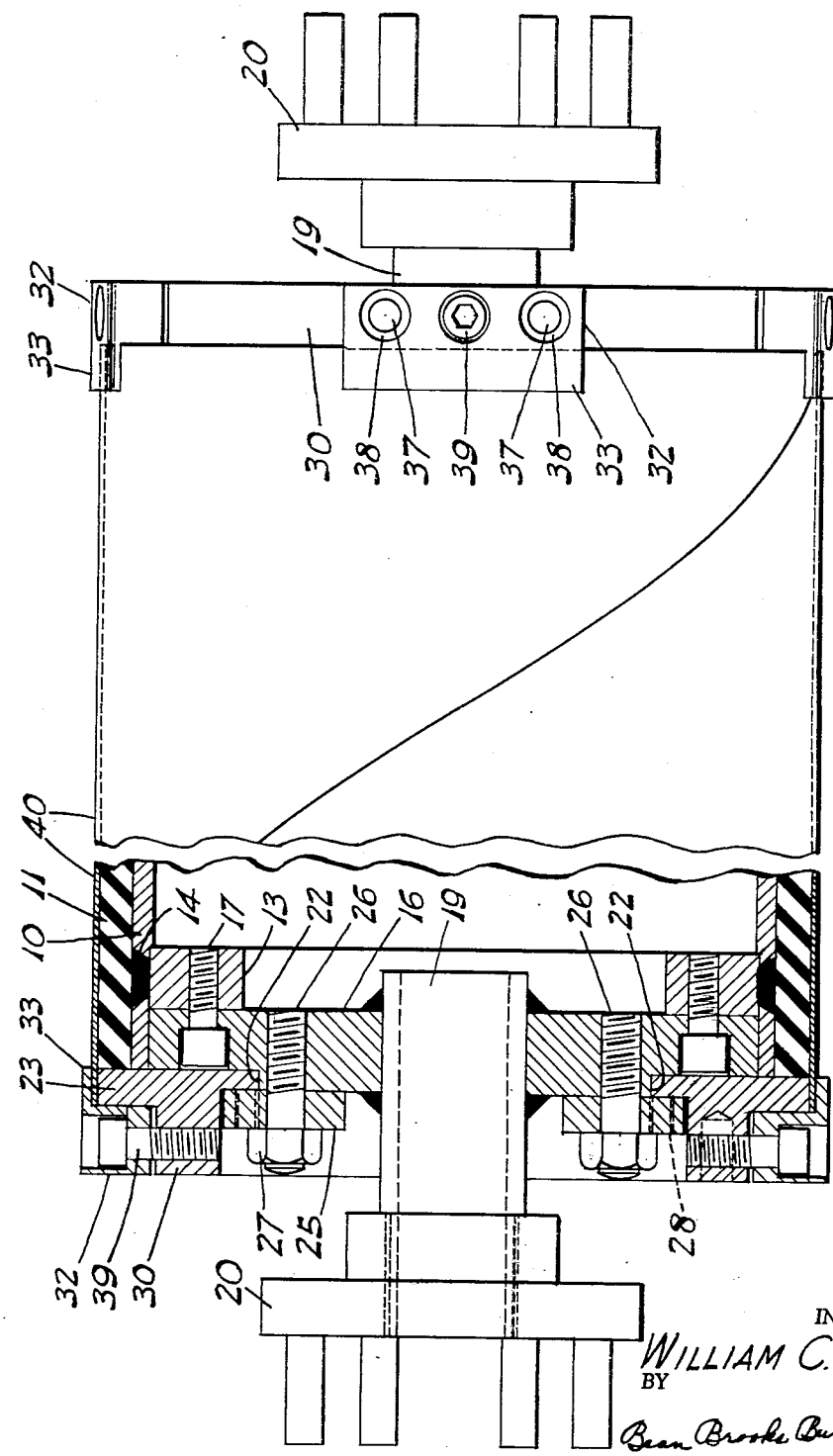

In the drawings:

Fig. 1 is an end elevational view of one form of the roll construction of the present invention; and Fig. 2 is a longitudinal cross sectional view taken approximately on the line II—II of Fig. 1.

The roll proper comprises a cylindrical metal shell 10 which, in the present instance, has a sleeve or cylinder of rubber or other cushioning material disposed thereabout as at 11 in Fig. 2. Internal flanges 13 are fixed within the opposite ends of shell 10, as by welding through openings 14 in shell 10 in the manner illustrated in Fig. 2. The flanges 13 are spaced inwardly from the ends of shell 10 and provide support for a pair of discoidal plates 16 which are screwed to flanges 13 as at 17.

The discoidal plates 16 have welded concentrically therein tubular shaft members 19 and the latter have reduced threaded outer end portions for receiving conventional coupling members 20 which, in the present instance, are components of well-known Ajax couplings. The outer portions of the outer faces of the discoidal plates 16 are recessed to form annular shoulders 22 and clamp-supporting ring members 23 fit upon and are accurately centered by such shoulders.

The recessed outer faces of the discoidal plates 16 are flush with the ends of the cylindrical shell 10 and its cushioning sleeve 11 and the inner faces of ring members 23 accordingly abut the ends of shell 10 and sleeve 11, as shown in Fig. 2. Furthermore, the outer peripheries of the ring members 23 are flush with the outer peripheral surface of cushioning sleeve 11. The ring members 23 are rotatably adjustable on the shoulders 22 in a manner and for a purpose which will presently appear.

Each of the ring members 23 is held in any desired angular position with respect to the discoidal plate 16 upon which it is mounted, and consequently with respect to the roll generally, by a pair of locking plates 25 which are best shown in Fig. 1. Each of the locking plates 25 is positioned against the outer face of the corresponding discoidal plate 16 by a stud 26 threaded into the plate 16 and is selectively locked thereto by a nut 27 engaging the outer end of the stud 26.

Pairs of socket head set screws 28 are threaded into the outer portions of the locking plates 25 which overlie the ring members 23 and are brought to bear against the latter to selectively prevent rotation of the ring members 23 on the discoidal plates 16. Obviously, loosening the four set screws 28 at one end of the roll permits rotation of the associated ring member 23.

Each of the ring members 23 is provided with a flange formation 30 which projects axially outwardly and is provided with four equally spaced flattened portions as shown at 31 in Fig. 1. Four clamp members 32 are mounted upon each of the ring members 23 at the flattened portions 31 thereof and each clamp member has an arcuate flange formation 33 at its outer peripheral edge which extends axially inwardly over the periphery of the adjacent ring member 23 to cooperate therewith in providing clamping means to grip an edge portion of a sheet of abrasive or similar coated or treated sheet material with which the roll is to be provided.

Each clamp member 32 is guided for radial movement toward and away from the adjacent flattened portion of ring member 23 by means of a pair of dowel or guide pins 37 which in the present instance bear slidably in bushings 38 in the clamp members 32. Each clamp member 32 is adapted to be urged toward its associated flattened portion 31 by a screw 39 to apply clamping pressure against the edge portion of a spirally wrapped sheet, one such sheet being designated 40 in the drawings.

After a sheet 40 has been wrapped about the cushioning sleeve 11 of shell 10 and is held at both ends between the clamping flanges and the peripheries of the ring members 23, and at any other time that the sheet 40 requires tightening on the roll, the set screws 28 are loosened and a spanner wrench is applied to ring member 23 by means of spanner holes designated 41 in Fig. 1 to rotate ring member 23 and the clamping members carried thereby to wrap the sheet 40 more tightly about the cushioning sleeve 11 of shell 10. The set screws 28 are then retightened.

I claim:

1. In a spiral-wrap roll for abrading, finishing and like operations, a cylindrical roll body having end wall members, said end wall members having central bearing formations to support the roll for abrading rotation, said end wall members having annular recesses at their outer faces and extending radially outwardly to the periphery of said roll body, said annular recesses forming radially outwardly facing annular ledges, ring members rotatably mounted on said ledges and having their outer peripheral portions flush with the periphery of said roll body to form axially extending continuations thereof, the axially outward portions of said ring members being of reduced diameter, circumferentially spaced clamp members carried by said reduced diameter portions and having arcuate clamping flanges overlying the flush peripheral portions of said ring member, means guiding said clamp members for radial movement toward and away from said reduced diameter portion for clamping and unclamping movements, releasable clamp means supported by the end faces of said end wall members of said roll body and engageable with inner peripheral portions of said ring members for locking the same relative to the roll body, and wrench receiving formations at the exposed outer faces of said ring members to effect rotation thereof relative to the roll body when said last-mentioned clamp means is in released condition.

2. In a spiral-wrap roll for abrading, finishing and like operations, a cylindrical roll body having end wall members, said end wall members having central bearing formations to support the roll for abrading rotation, said end wall members having annular recesses at their outer faces and extending radially outwardly to the periphery of said roll body, said annular recesses forming radially outwardly facing annular ledges, ring members rotatably mounted on said ledges and having their outer peripheral portions flush with the periphery of said roll body to form axially extending continuations thereof, the axially outward portions of said ring members being of reduced diameter, circumferentially spaced clamp members carried by said reduced diameter portions and having arcuate clamping flanges overlying the flush peripheral portions of said ring member, means guiding said clamp members for radial movement toward and away from said reduced diameter portion for clamping and unclamping movements, and releasable clamp means supported by the end faces of said end wall members of said roll body and engageable with said ring members for locking the same relative to the roll body.

3. In a spiral-wrap roll for abrading, finishing and like operations, a cylindrical roll body having end wall members and a peripheral layer of resilient material, said end wall members having central bearing formations to support the roll for abrading rotation, said end wall members having annular recesses at their outer faces and extending radially outwardly to the periphery of said roll body, said annular recesses forming radially outwardly facing annular ledges, ring members rotatably mounted on said ledges and having their outer peripheral portions flush with the periphery of said layer of resilient material to form axially extending continuations thereof, the axially outward portions of said ring members being of reduced diameter, circumferentially spaced releasable clamp members carried by said reduced diameter portions and having arcuate clamping flanges overlying the flush peripheral portions of said ring member, locking means engageable with said ring members for locking the same relative to the roll body, said locking means being releasable to permit rotation of said ring members relative to the roll body.

4. In a spiral-wrap roll for abrading, finishing and like operations, a cylindrical roll body including an end wall member, having annular recesses at its outer face extending radially outwardly to the periphery of said roll body, said annular recess forming a radially outwardly facing annular ledge, a ring member rotatably mounted on said ledge and having its outer peripheral portion flush with the periphery of said roll body to form an axially extending continuation thereof, the axially outward portion of said ring member being of reduced diameter, circumferentially spaced clamp members carried by said reduced diameter portion and having arcuate clamping flanges overlying the flush peripheral portion of said ring member, means guiding said clamp members for radial movement toward and away from said reduced diameter portion for clamping and unclamping movements, and releasable means for locking said ring member relative to the roll body.

References Cited in the file of this patent

UNITED STATES PATENTS

| | | |
|---|---|---|
| 646,511 | Thomas | Apr. 3, 1900 |
| 700,189 | Fowler | May 20, 1902 |
| 732,796 | Storm | July 7, 1903 |
| 801,003 | Gordon | Oct. 3, 1905 |